US012804259B2

(12) United States Patent
Miyashita

(10) Patent No.: US 12,804,259 B2
(45) Date of Patent: Nov. 17, 2026

(54) MULTI-ANGLE SHOOTING SYSTEM FOR CONTROLLING OPERATION OF COOLING APPARATUS IN ACCORDANCE WITH OPERATING SOUND OF COOLING APPARATUS

(71) Applicant: CANON KABUSHIKI KAISHA, Tokyo (JP)

(72) Inventor: Hayato Miyashita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 19/226,703

(22) Filed: Jun. 3, 2025

(65) Prior Publication Data

US 2025/0380056 A1 Dec. 11, 2025

(30) Foreign Application Priority Data

Jun. 11, 2024 (JP) ................................ 2024-094510

(51) Int. Cl.

| | |
|---|---|
| ***H04N 5/335*** | (2011.01) |
| ***G03B 17/55*** | (2021.01) |
| ***H04N 23/63*** | (2023.01) |
| ***H04N 23/667*** | (2023.01) |
| ***H04N 23/90*** | (2023.01) |
| ***H04W 76/15*** | (2018.01) |
| *H04N 23/66* | (2023.01) |

(52) U.S. Cl.

CPC ........... *H04N 23/667* (2023.01); *G03B 17/55* (2013.01); *H04N 23/633* (2023.01); *H04N 23/90* (2023.01); *H04W 76/15* (2018.02); *H04N 23/66* (2023.01)

(58) Field of Classification Search

CPC ..................................................... G03B 17/55

See application file for complete search history.

(56) References Cited

U.S. PATENT DOCUMENTS

| | | | | |
|---|---|---|---|---|
| 12,598,367 B2 * | 4/2026 | Kumon | .................. | H04N 23/52 |
| 2016/0134856 A1 * | 5/2016 | Kawai | .................... | H04N 9/806 386/223 |
| 2016/0270256 A1 * | 9/2016 | Abe | .................. | H05K 7/20209 |
| 2023/0126699 A1 | 4/2023 | Iwagami | | |
| 2026/0025946 A1 * | 1/2026 | Kasumi | .................. | H04N 23/52 |

FOREIGN PATENT DOCUMENTS

| | | |
|---|---|---|
| JP | 2005084367 A | 3/2005 |
| JP | 2020031286 A | 2/2020 |
| JP | 2024059438 A | 5/2024 |

* cited by examiner

*Primary Examiner* — Gary C Vieaux

(74) *Attorney, Agent, or Firm* — Cowan, Liebowitz & Latman, P.C.

(57) ABSTRACT

A control apparatus includes a connection unit capable of connecting a plurality of image capture apparatuses and at least one microphone and a controller that controls the plurality of image capture apparatuses and a cooling apparatus of at least one of the plurality of image capture apparatuses. The controller decides a threshold of an operating sound of the cooling apparatus based on sound data obtained from the microphone upon operating the cooling apparatus, and controls an operation of the cooling apparatus to maximize a driving amount within a range in which the operating sound of the cooling apparatus does not exceed the threshold.

16 Claims, 12 Drawing Sheets

MULTI-ANGLE SHOOTING SYSTEM FOR CONTROLLING OPERATION OF COOLING APPARATUS IN ACCORDANCE WITH OPERATING SOUND OF COOLING APPARATUS

BACKGROUND

Field of the Technology

The present disclosure relates to a multi-angle shooting system.

Description of the Related Art

In a multi-angle shooting system capable of switching, displaying, and playing back a plurality of images of different viewpoints shot by a plurality of image capture apparatuses, the load and the amount of generated heat tend to increase because the image capture apparatus simultaneously performs image shooting and communication. The image capture apparatus incorporates a cooling apparatus such as a fan, and the operating sound of the fan may be mixed in a sound recorded during image shooting.

To solve this, Japanese Patent Laid-Open No. 2020-31286 discloses a technique of setting 1 kHz as the peak frequency of the operating sound of a fan detachable from an image capture apparatus, and controlling the direction of heat exhaust by the fan.

However, in Japanese Patent Laid-Open No. 2020-31286, 1 kHz or less avoiding a frequency band generated by a voice conversation is only set as the peak frequency of the operating sound of a fan, and neither the distance between the fan and a microphone nor switching of a plurality of image capture apparatuses for image shooting is considered. In Japanese Patent Laid-Open No. 2020-31286, the fan and the microphone are distant from each other. Thus, even when the operating sound of the fan is rarely mixed in a sound recorded during image shooting, the image capture apparatus cannot be driven at a frequency exceeding 1 kHz to enhance the cooling capacity. In the multi-angle shooting system, the microphone is sometimes switched when switching the image capture apparatus. In switching the microphone, the influence of the operating sound of the fan on a sound recorded during image shooting may change only by setting the peak frequency of the operating sound of the fan as in Japanese Patent Laid-Open No. 2020-31286. Hence, the fan needs to be driven properly.

SUMMARY

The present disclosure has been made in consideration of the aforementioned problems, and realizes techniques of properly operating a cooling apparatus so that the operating sound of the cooling apparatus does not influence a sound recorded during image shooting.

The present disclosure is directed to a control apparatus comprising: a connection unit capable of connecting a plurality of image capture apparatuses and at least one microphone; and a controller that controls the plurality of image capture apparatuses and a cooling apparatus of at least one of the plurality of image capture apparatuses, wherein the controller decides a threshold of an operating sound of the cooling apparatus based on sound data obtained from the microphone upon operating the cooling apparatus, and controls an operation of the cooling apparatus to maximize a driving amount within a range in which the operating sound of the cooling apparatus does not exceed the threshold.

The present disclosure is directed to a control method of a control apparatus in which a plurality of image capture apparatuses and at least one microphone are connectable, and the plurality of image capture apparatuses and a cooling apparatus of at least one of the plurality of image capture apparatuses are controlled, the method comprising: deciding a threshold of an operating sound of the cooling apparatus based on sound data obtained from the microphone upon operating the cooling apparatus; and controlling an operation of the cooling apparatus to maximize a driving amount within a range in which the operating sound of the cooling apparatus does not exceed the threshold.

Features of the present disclosure will become apparent from the following description of embodiments with reference to the attached drawings. The following description of embodiments are described by way of example.

BRIEF DESCRIPTION OF THE DRAWINGS

The accompanying drawings, which are incorporated in and constitute a part of the specification, illustrate embodiments of the present disclosure, and together with the description, serve to explain the principles of the embodiments.

DESCRIPTION OF THE EMBODIMENTS

Figure 1:
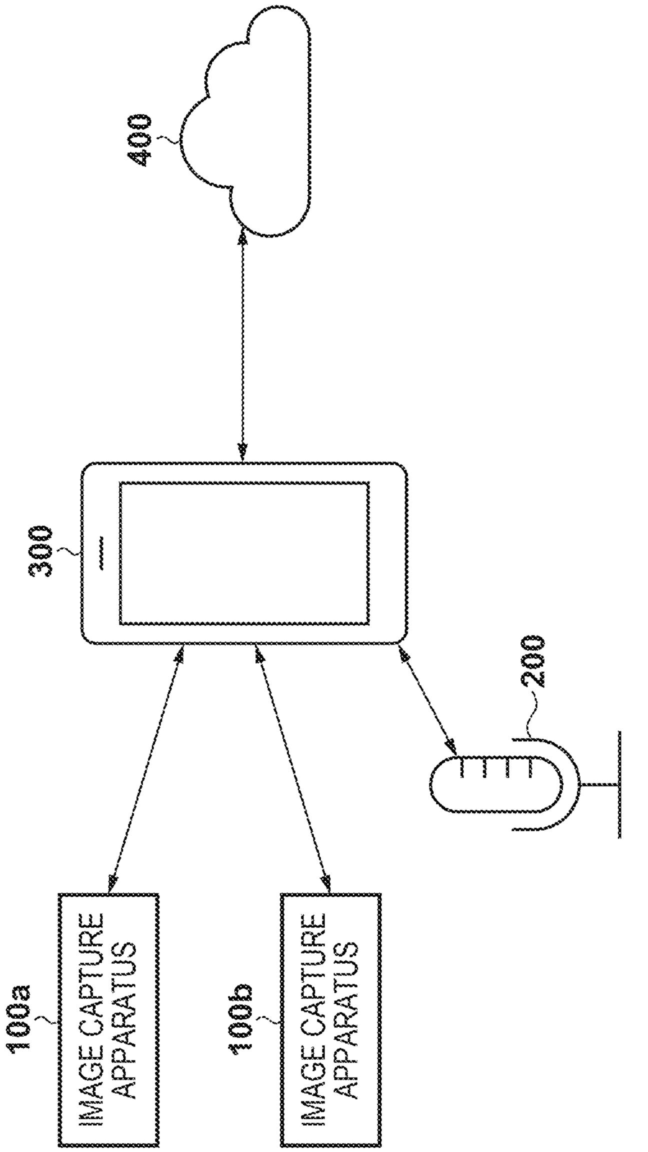
FIG. 1 is a view of the configuration of a system according to a present embodiment.

Hereinafter, embodiments will be described in detail with reference to the attached drawings. Note, the following embodiments are not intended to limit the scope of the claims. Multiple features are described in the embodiments, but it is not the case that all such features are required, and multiple such features may be combined as appropriate. Furthermore, in the attached drawings, the same reference numerals are given to the same or similar configurations, and redundant description thereof is omitted.

<System Configuration>

First, a system configuration according to a present embodiment will be explained with reference to FIG. 1.

A multi-angle shooting system (to be referred to as a system hereinafter) according to the present embodiment includes a plurality of image capture apparatuses 100*a* and 100*b*, an external microphone 200, a control apparatus 300, and a delivery apparatus 400. In the system according to the present embodiment, the control apparatus 300 can switch, between the image capture apparatuses 100*a* and 100*b* having different shooting directions, an image capture apparatus from which image data is received. The control apparatus 300 can transmit, to the delivery apparatus 400, images of a plurality of viewpoints shot by the image capture apparatuses 100*a* and 100*b*, and a sound collected by the external microphone 200. Note that image data can include moving image data, sound-combined moving image data, and still image data, and sound data can include data such as sound-recognized characters and captions (texts).

The image capture apparatuses 100*a* and 100*b* are arranged at positions spaced apart from each other to have different shooting positions and/or shooting directions. The angles of view of shooting of the image capture apparatuses 100*a* and 100*b* are fixed or variable by the control apparatus 300. The image capture apparatuses 100*a* and 100*b* are connectable to the control apparatus 300 by a wireless communication method or a wired communication method. Although the two image capture apparatuses 100*a* and 100*b* will be explained in the present embodiment, the number of image capture apparatuses may be three or more. The image capture apparatuses 100*a* and 100*b* are, for example, digital cameras, but are not limited to this example and may be smartphones, Web cameras such as monitoring cameras, medical cameras, or the like.

The external microphone 200 is connectable to the control apparatus 300 by a wireless communication method or a wired communication method. The external microphone 200 includes a microphone that collects a sound during image shooting by the image capture apparatuses 100*a* and 100*b*. Although one external microphone 200 will be explained in the present embodiment, the number of external microphones may be two or more.

The control apparatus 300 is connected to the image capture apparatuses 100*a* and 100*b* in a communication-enabling manner by a wireless method or a wired method so that it can control the image capture apparatuses 100*a* and 100*b* from a remote place. The image capture apparatuses 100*a* and 100*b* transmit image data to the control apparatus 300. The control apparatus 300 can switch, between the image capture apparatuses 100*a* and 100*b*, an image capture apparatus from which an image is received. The control apparatus 300 receives, from at least either the image capture apparatus 100*a* or 100*b*, sound data collected by a camera microphone 113 of the image capture apparatus 100*a* or 100*b*. The image capture apparatuses 100*a* and 100*b* transmit sound data collected by the camera microphones 113 to the control apparatus 300. The control apparatus 300 is connected to the external microphone 200 in a communication-enabling manner by a wireless method or a wired method so that it can control the external microphone 200 from a remote place. The external microphone 200 transmits sound data to the control apparatus 300. The control apparatus 300 receives the sound data from the external microphone 200.

The control apparatus 300 is connectable to the delivery apparatus 400 by a wireless communication method or a wired communication method. The control apparatus 300 transmits, to the delivery apparatus 400, image data received from the image capture apparatuses 100*a* and 100*b*, sound data received from at least either the image capture apparatus 100*a* or 100*b*, or sound data received from the external microphone 200. When transmitting image data received from the image capture apparatuses 100*a* and 100*b* to the delivery apparatus 400, the control apparatus 300 applies image processing or the like on the image data, converts the image data into a data format suited to delivery, and then transmits the resultant image data to the delivery apparatus 400. The control apparatus 300 controls whether to transmit, to the delivery apparatus 400, image data received from at least either the image capture apparatus 100*a* or 100*b*.

The control apparatus 300 is an information processing apparatus such as a personal computer (desktop PC or notebook PC), or a mobile device such as a tablet PC, a smartphone, a smartwatch, or smart glasses.

The delivery apparatus 400 is connectable to the control apparatus 300 by a wireless communication method or a wired communication method. The delivery apparatus 400 receives image data and/or sound data from the control apparatus 300. The delivery apparatus 400 is a service or system that distributes at once, to the terminals of a plurality of viewers or the like by streaming or the like, image data and/or sound data received from the control apparatus 300. There are provided various services and systems that perform delivery, and there are services and systems suited to purposes and applications such as entertainment, promotion, and training.

The control apparatus 300 and the delivery apparatus 400 are connected in a communication-enabling manner by a network such as a local area network (LAN), the Internet, a public communication channel, or the like.

<Apparatus Configuration>

Figure 2:
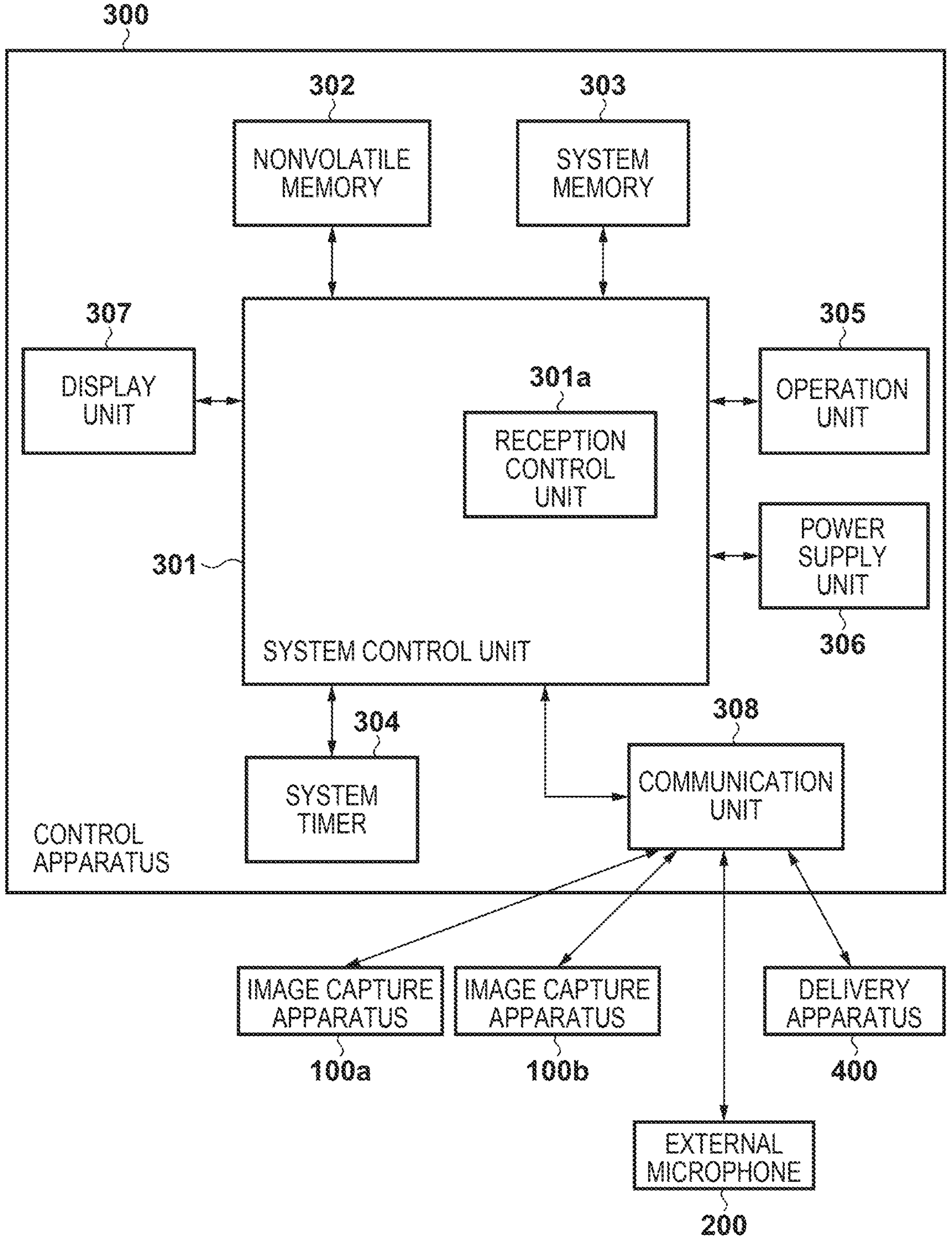
FIG. 2 is a block diagram illustrating the configuration of a control apparatus according to the present embodiment.

FIG. 2 is a block diagram illustrating the configuration of the control apparatus 300 according to the present embodiment.

A system control unit 301 includes at least one processor, and controls the overall control apparatus 300. The system control unit 301 implements each step of a flowchart (to be described later) by loading, to a system memory 303, a program stored in a nonvolatile memory 302, and executing the program. Note that the overall apparatus may be controlled by sharing processing between a plurality of hardware units, instead of controlling the overall apparatus by the system control unit 301.

The nonvolatile memory 302 is an electrically erasable/programmable memory and for example, a flash ROM or the like is used. Constants, programs, and the like for the operation of the system control unit 301 are stored in the nonvolatile memory 302. Programs in the present embodiment are programs for executing flowcharts to be described later with reference to FIGS. 6 to 10 and 12.

In addition, an operating system (OS) as basic software to be executed by the system control unit 301, and applications that implement applied functions in cooperation with the OS are stored in the nonvolatile memory 302. Also, an application for communicating with the image capture apparatuses 100*a* and 100*b*, the external microphone 200, and the delivery apparatus 400 is stored in the nonvolatile memory 302. Further, a file transfer application for communicating with the image capture apparatuses 100*a* and 100*b* and the delivery apparatus 400 is stored in the nonvolatile memory 302. An application for storing and managing image data obtained from the image capture apparatuses 100*a* and 100*b* is stored in the nonvolatile memory 302.

Processing of the control apparatus 300 according to the present embodiment is implemented by loading software provided by an application. Note that the application is assumed to have software for using the basic functions of an OS installed in the control apparatus 300. Note that the OS of the control apparatus 300 may have software for implementing processing in the present embodiment.

The system memory 303 is a volatile memory and for example, a RAM is used. The system memory 303 is used as a work memory in which constants and variables for the operation of the system control unit 301, programs read out from the nonvolatile memory 302, and the like are deployed. The system memory 303 is also used as a buffer memory in which image data received from the image capture apparatuses 100*a* and 100*b*, sound data received from the external microphone 200, and image data and sound data to be transmitted to the delivery apparatus 400 are temporarily stored, and a display memory in which display data to be displayed on a display unit 307 are temporarily stored.

A system timer 304 is a circuit that measures the time used for various control operations and the time of a built-in clock.

An operation unit 305 is an operation member, such as a switch, a button, or a touch panel, that accepts various operations from a user and notifies the system control unit 301 of them. The operation unit 305 includes a power supply switch that switches power ON/OFF of the control apparatus 300.

The power supply unit 306 is constituted by a battery detection circuit, a DC-DC converter, a switching circuit that switches a block to be energized, and the like, and detects attachment/detachment of a battery, the type of battery, and the remaining battery level. The power supply unit 306 controls the DC-DC converter based on the detection results and an instruction from the system control unit 301, and supplies a necessary voltage to each component of the control apparatus 300 for a necessary period. The power supply unit 306 includes a primary battery such as an alkaline battery or a lithium battery, a secondary battery such as an NiCd battery, an NiMH battery, or a lithium ion battery, an AC adapter, and the like.

The display unit 307 includes a liquid crystal panel, an organic EL panel, or the like, and displays images, various kinds of information, and a graphical user interface (GUI) so that the user can visually recognize them.

The control apparatus 300 includes a loudspeaker that outputs a sound received from the external microphone 200.

The communication unit 308 is connected in a communication-enabling manner to external apparatuses such as the image capture apparatuses 100*a* and 100*b*, the external microphone 200, and the delivery apparatus 400 by a wireless antenna or a wired cable, and transmits/receives data. The communication unit 308 is also connectable to Wi-Fi® and the Internet. The communication unit 308 can transmit/receive information about control, image data, and sound data to/from the image capture apparatuses 100*a* and 100*b*, the external microphone 200, and the delivery apparatus 400. Note that the communication unit 308 may use not only Wi-Fi, but also a wireless communication interface such as infrared communication, Bluetooth®, or Wireless USB, or a wired connection interface such as a USB cable, HDMI®, or IEEE 1394.

The system control unit 301 includes a reception control unit 301*a*. The reception control unit 301*a* can switch, between the image capture apparatuses 100*a* and 100*b* in accordance with a user operation or automatically, an image capture apparatus from which an image is received. The system control unit 301 transmits, to the delivery apparatus 400, an image received from at least either the image capture apparatus 100*a* or 100*b* and a sound collected by the external microphone 200.

Figure 3:
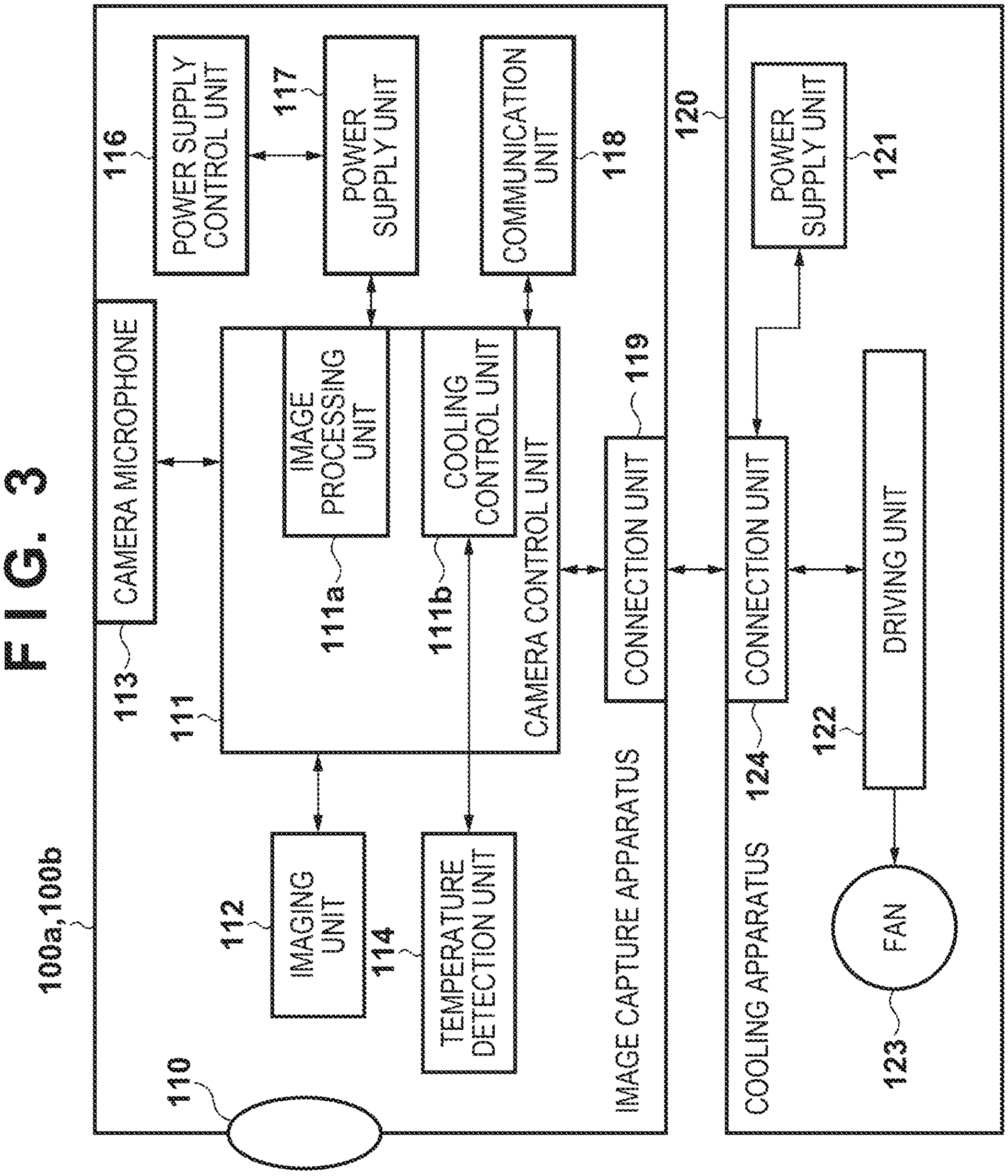
FIG. 3 is a block diagram illustrating the configuration of an image capture apparatus according to the present embodiment.

FIG. 3 is a block diagram illustrating the configurations of the image capture apparatus and cooling apparatus according to the present embodiment.

Although the image capture apparatuses 100*a* and 100*b* have the same configuration in the description of the present embodiment, they may have different configurations as long as they can transmit video data and sound data to the control apparatus 300.

Although cooling apparatuses 120 connectable to the image capture apparatuses 100*a* and 100*b* have the same configuration in the description of the present embodiment, they may have different configurations as long as they can cool the inside of the image capture apparatus by a cooling unit such as a fan that generates an operating sound.

Each of the image capture apparatuses 100*a* and 100*b* includes an optical unit 110, a camera control unit 111, an imaging unit 112, a camera microphone 113, a temperature detection unit 114, a power supply control unit 116, a power supply unit 117, a communication unit 118, and a connection unit 119.

The camera control unit 111 includes a processor (CPU) that performs arithmetic processing and control processing of the image capture apparatus 100*a* or 100*b*, a volatile memory (ROM) that stores programs to be executed by the processor, and a work memory (RAM) to which programs read out from a nonvolatile memory, constants and variables for executing the programs, and the like are loaded. The camera control unit 111 controls each component of the image capture apparatus 100*a* or 100*b* by loading into the RAM a program stored in the ROM and executing it.

The optical unit 110 includes a lens unit including a zoom lens and a focus lens, and a shutter having a stop function. The optical unit 110 adjusts the magnification, in-focus state, and light quantity of an object image reaching the imaging unit 112, and forms the object image on the imaging plane of the imaging unit 112.

The imaging unit 112 includes an image sensor constituted by a CCD, a CMOS sensor, or the like that converts the object image formed by the optical unit 110 into an electrical signal, and an A/D converter that converts an analog video signal output from the image sensor into a digital signal. Under the control of the camera control unit 111, the imaging unit 112 converts object image light formed by a lens included in the imaging unit 112 into an electrical signal by the image sensor, performs noise reduction processing and the like, and outputs video data formed from a digital signal.

The camera control unit 111 includes an image processing unit 111*a*. The image processing unit 111*a* performs pixel interpolation, resizing processing such as reduction, and color conversion processing on video data captured by the imaging unit 112. Also, the image processing unit 111*a* compression-encodes still image data having undergone image processing by the JPEG format or the like, or encodes moving image data by a moving image compression method such as the MP4 format to generate an image file and record it on a recording medium. The camera control unit 111 performs autofocus (AF) processing and auto exposure (AE) processing by performing predetermined arithmetic processing using captured video data, and controlling the focus lens, stop, and shutter of the imaging unit 112 based on the obtained arithmetic result.

The camera control unit 111 transmits video data generated by the image processing unit 111*a* to the control apparatus 300 via the communication unit 118.

The temperature detection unit 114 is one or a plurality of thermometers that measure the temperature of a predetermined portion of the image capture apparatus 100*a* or 100*b*. The temperature detection unit 114 is constituted by a thermistor, a temperature sensor IC, or the like that converts a temperature into a physical quantity such as a voltage or resistance value, and outputs the physical quantity.

The camera control unit 111 includes a cooling control unit 111*b*. The cooling control unit 111*b* decides the driving amount of a fan 123 of the cooling apparatus 120 based on temperature information obtained from the temperature detection unit 114, and controls the rotational speed of the fan 123 based on the driving amount.

The image processing unit 111*a* and cooling control unit 111*b* included in the camera control unit 111 function by executing programs stored in the ROM by the CPU. Note that the image processing unit 111*a* and the cooling control unit 111*b* may be constituted by hardware units independent of the CPU.

The camera microphone 113 is incorporated in the image capture apparatus 100*a* or 100*b*, or connected to the image capture apparatus 100*a* or 100*b* via the sound terminal of the image capture apparatus 100*a* or 100*b*. The camera microphone 113 converts, into a digital signal, an analog sound signal generated by collecting a sound around the image capture apparatus 100*a* or 100*b*, and outputs the digital signal to the camera control unit 111.

The camera control unit 111 performs various sound processes on the digital sound signal generated by the camera microphone 113 to generate sound data and transmit it to the control apparatus 300 via the communication unit 118. The camera control unit 111 can combine sound data generated during moving image shooting with moving image data and record it, or can record only moving image data without combining sound data.

The power supply control unit 116 controls the power supply unit 117 of the image capture apparatus 100*a* or 100*b*, and controls power supply to each component of the image capture apparatus 100*a* or 100*b*. In addition, the power supply control unit 116 controls a power supply unit 121 of the cooling apparatus 120 and controls power supply to each component of the cooling apparatus 120.

The power supply unit 117 is a primary battery such as an alkaline battery or a lithium battery, or a secondary battery such as an NiCd battery, an NiMH battery, or an Li ion battery.

The connection unit 119 is a connector mechanically and electrically connected to a connection unit 124 of the cooling apparatus 120 (to be described later). The connection unit 119 includes a communication terminal for connecting in a communication-enabling manner to the cooling apparatus 120, and a power supply terminal for exchanging power between the image capture apparatus 100*a* or 100*b* and the cooling apparatus 120.

The communication unit 118 is connected in a communication-enabling manner to an external apparatus such as the control apparatus 300 by a wireless antenna or a wired cable, and transmits/receives data. The communication unit 118 receives control information of the image capture apparatus 100*a* or 100*b* and the cooling apparatus 120 from the control apparatus 300, and transmits, to the control apparatus 300, video data (including a live view video) captured by the imaging unit 112, an image file recorded on a recording medium, and sound data generated by the camera microphone 113. Note that the communication unit 118 is a wireless communication interface such as Wi-Fi®, infrared communication, Bluetooth®, or Wireless USB, or a wired connection interface such as a USB cable, HDMI®, or IEEE 1394.

The cooling apparatus 120 includes the power supply unit 121, a driving unit 122, the fan 123, and the connection unit 124.

The power supply unit 121 is a primary battery such as an alkaline battery or a lithium battery, or a secondary battery such as an NiCd battery, an NiMH battery, or an Li ion battery.

The driving unit 122 includes a motor that drives the fan 123, and drives the fan 123 to rotate at a target rotational speed based on the driving amount of the fan 123 received from the cooling control unit 111*b* of the image capture apparatus 100*a* or 100*b*.

The fan 123 includes a fan driven to rotate by power of the power supply unit 121. A cooling air generated by the rotation of the fan 123 is supplied into the housing of the image capture apparatus 100*a* or 100*b* to decrease the internal temperature of the image capture apparatus 100*a* or 100*b*.

The connection unit 124 is a connector mechanically and electrically connected to the connection unit 119 of the image capture apparatus 100*a* or 100*b*. The connection unit 124 includes a communication terminal for connecting in a communication-enabling manner to the image capture apparatus 100*a* or 100*b*, and a power supply terminal for exchanging power between the cooling apparatus 120 and the image capture apparatus 100*a* or 100*b*.

The cooling apparatus 120 is connected as an external apparatus to the image capture apparatus 100*a* or 100*b*, but may also be incorporated in the image capture apparatus 100*a* or 100*b*. When, for example, the cooling apparatus 120 is incorporated in the image capture apparatus 100*a* or 100*b* and the connection units 119 and 124 are not used, rubber covers or the like can be attached to the connection units 119 and 124 to prevent external exposure of the connection units 119 and 124.

Figure 4:
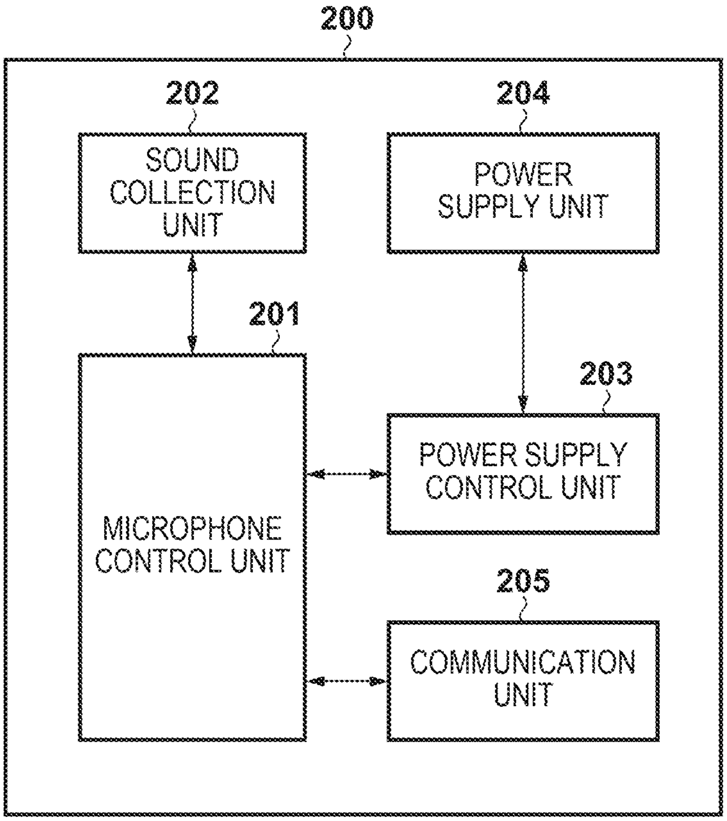
FIG. 4 is a block diagram illustrating the configuration of an external microphone according to the present embodiment.

FIG. 4 is a block diagram illustrating the configuration of the external microphone 200 according to the present embodiment.

The external microphone 200 includes a microphone control unit 201, a sound collection unit 202, a power supply control unit 203, a power supply unit 204, and a communication unit 205.

The microphone control unit 201 includes a processor (CPU) that performs arithmetic processing and control processing of the external microphone 200, a volatile memory (ROM) that stores programs to be executed by the processor, and a work memory (RAM) to which programs read out from a nonvolatile memory, constants and variables for executing the programs, and the like are loaded. The microphone control unit 201 controls each component of the external microphone 200 by loading into the RAM a program stored in the ROM and executing it.

The sound collection unit 202 is incorporated in the external microphone 200, or connected to the external microphone 200 via the sound terminal of the external microphone 200. The sound collection unit 202 converts, into a digital signal, an analog sound signal generated by collecting a sound around the external microphone 200, and outputs the digital signal to the microphone control unit 201.

The microphone control unit 201 performs various sound processes on the digital sound signal generated by the sound collection unit 202 to generate sound data and transmit it to the control apparatus 300 via the communication unit 205.

The power supply control unit 203 controls the power supply unit 204 of the external microphone 200, and controls power supply to each component of the external microphone 200.

The power supply unit 204 is a primary battery such as an alkaline battery or a lithium battery, or a secondary battery such as an NiCd battery, an NiMH battery, or an Li ion battery.

The communication unit 205 is connected in a communication-enabling manner to an external apparatus such as the control apparatus 300 by a wireless antenna or a wired cable, and transmits/receives data. The communication unit 205 receives control information of the external microphone 200 from the control apparatus 300, and transmits sound data generated by the sound collection unit 202 to the control apparatus 300. Note that the communication unit 205 is a wireless communication interface such as Wi-Fi®, infrared communication, Bluetooth®, or Wireless USB, or a wired connection interface such as a USB cable, HDMI®, or IEEE 1394.

<Data Processing>

Next, a sequence of data processing of the control apparatus 300 according to the present embodiment will be explained with reference to FIG. 5.

Figure 5:
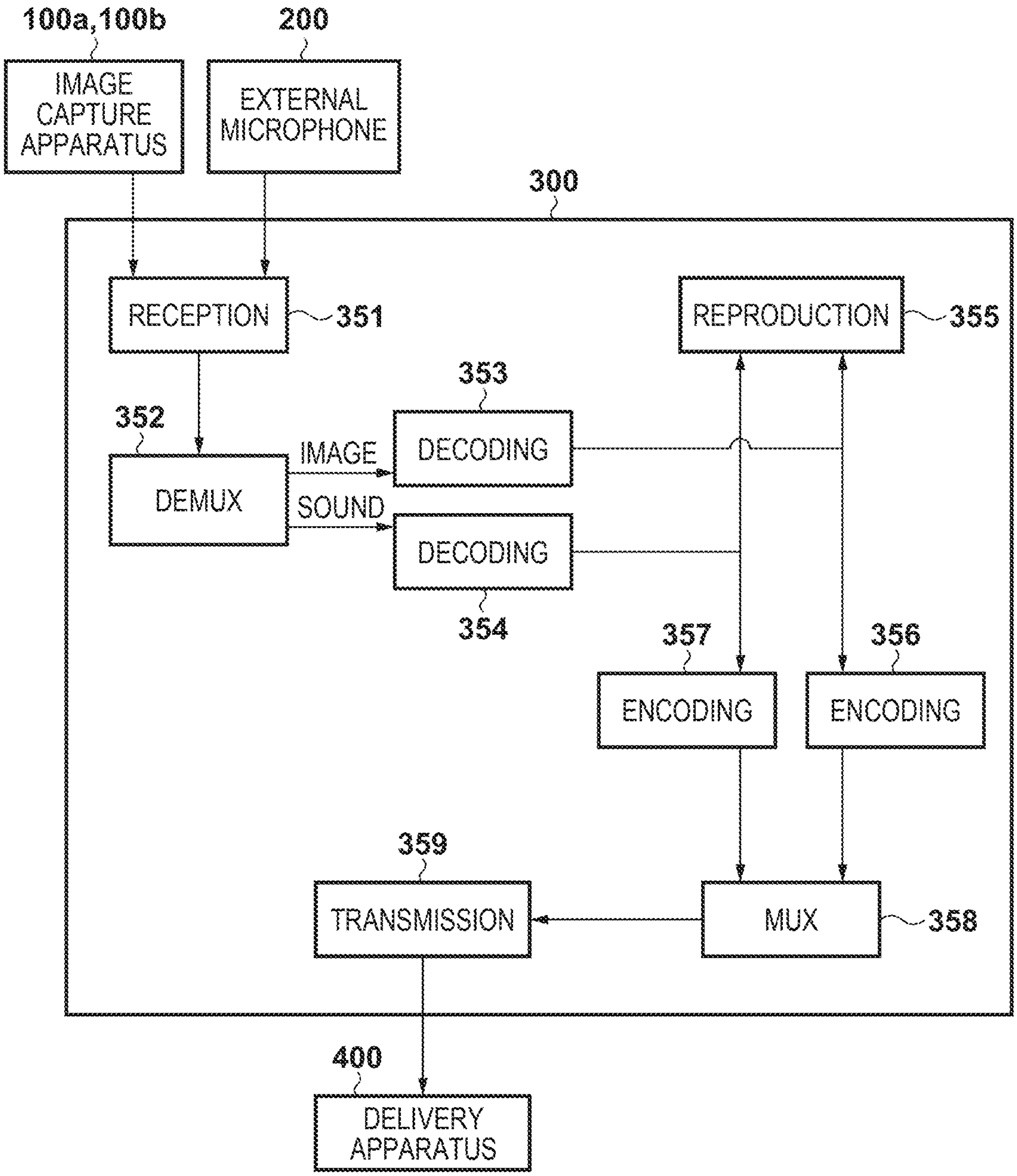
FIG. 5 is a view for explaining a sequence of data processing of image and sound according to the present embodiment.

The data processing in FIG. 5 is executed by the system control unit 301 of the control apparatus 300. In each process, Read/Write of data with respect to the system memory 303 is executed.

In reception processing 351, image data is received from the image capture apparatus 100*a* or 100*b* connected via the communication unit 308, and sound data is received from the external microphone 200. The image data and the sound data are stored as a combined image file in the system memory 303. The format of data received in the reception processing 351 is RTMP in the present embodiment, but is not limited to this example and may be another format.

In DEMUX processing 352, the data of the RTMP format received in the reception processing 351 is separated into an image file and a sound file. The format of the image file and sound file is FLV in the present embodiment, but is not limited to this example and may be another format. In the DEMUX processing 352, image data is further extracted from the image file and sent to decode processing 353, and sound data is extracted from the sound file and sent to decode processing 354. The formats of the image data and sound data are H.264 and AAC in the present embodiment, but are not limited to this example and may be other formats.

In the decode processing 353, the image data is converted into a general-purpose data format, and the converted data is sent to reproduction processing 355 and encode processing 356. In the decode processing 354, the sound data is converted into a general-purpose data format, and the converted data is sent to the reproduction processing 355 and encode processing 357. Since the image data and sound data sent from the DEMUX processing 352 have undergone advanced encode processing, they are decoded into a general-purpose data format reproducible in the reproduction processing 355 and sent to the reproduction processing 355.

In the encode processing 356 and the encode processing 357, advanced encode processing is performed again on the image data and sound data that have been converted into the general-purpose data formats in the decode processing 353 and the decode processing 354. The resultant image data and sound data are sent to MUX processing 358. The formats of the image data and sound data after the encode processing are H.264 and AAC in the present embodiment. The data formats for encoding in the encode processing 356 and the encode processing 357 are decided in accordance with data formats receivable by the delivery apparatus 400.

In the MUX processing 358, the image data and sound data encoded in the encode processing 356 and the encode processing 357 are combined, and the combined data is sent to transmission processing 359. The data format of the image data and sound data after combination is the FLV format.

In the transmission processing 359, the data format of the combination of the image data and sound data is converted into a data format for streaming, and the converted data is transmitted to the delivery apparatus 400. The data formats for encoding in the MUX processing 358 and the transmission processing 359 are decided in accordance with data formats receivable by the delivery apparatus 400.

The data processing and the data format in the control apparatus 300 according to the present embodiment do not only comply with a data format output from the image capture apparatus 100*a* or 100*b* and a data format receivable by the delivery apparatus 400, but can also be decided in accordance with the processing speeds of decoding and encoding and the quality characteristics of image and sound.

In the following description, the components of the image capture apparatus 100*a* are represented as a camera microphone 113*a*, a cooling apparatus 120*a*, and a fan 123*a*, and those of the image capture apparatus 100*b* are represented as a camera microphone 113*b*, a cooling apparatus 120*b*, and a fan 123*b*.

<Control Processing>

Next, control processing of the system according to the present embodiment will be explained with reference to FIG. 6.

Figure 6:
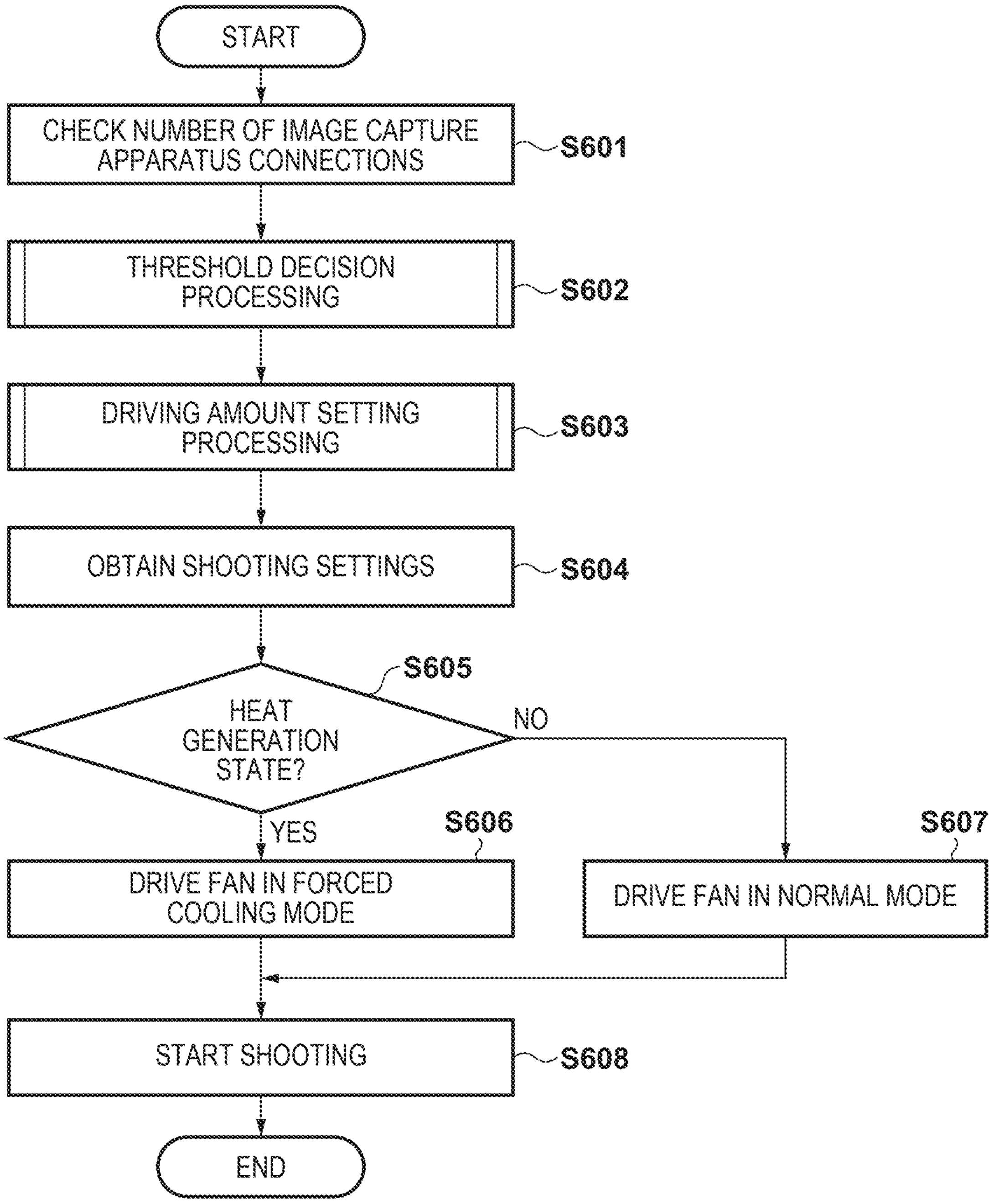
FIG. 6 is a flowchart illustrating control processing according to a first embodiment.

The processing in FIG. 6 is implemented by executing a program stored in the ROM by the system control unit 301 of the control apparatus 300, and controlling the image capture apparatuses 100*a* and 100*b*. The processing in FIG. 6 starts in a state in which the image capture apparatuses 100*a* and 100*b*, the external microphone 200, and the control apparatus 300 are connected in a communication-enabling manner. Note that the cooling apparatus 120*a* is connected to the image capture apparatus 100*a*, and the cooling apparatus 120*b* is connected to the image capture apparatus 100*b*. This also applies to FIGS. 10 and 12 to be described later.

In step S601, the system control unit 301 checks the number of image capture apparatuses connected to the control apparatus 300. In the present embodiment, the two image capture apparatuses 100*a* and 100*b* are connected to the control apparatus 300.

In step S602, the system control unit 301 executes threshold decision processing to be described later with reference to FIG. 8.

In step S603, the system control unit 301 controls the image capture apparatuses 100*a* and 100*b* to execute driving amount setting processing of the cooling apparatuses 120*a* and 120*b* to be described later with reference to FIG. 7. The driving amount setting processing is executed on all the image capture apparatuses 100*a* and 100*b* connected to the control apparatus 300 to decide the driving amounts of the fans 123*a* and 123*b* of the cooling apparatuses 120*a* and 120*b* in which the influence on sound data recorded by the control apparatus 300 is reduced.

In step S604, the system control unit 301 obtains the shooting settings of the image capture apparatuses 100*a* and 100*b* that are set by the user. The shooting settings are, for example, 4K/120P and the like.

In step S605, the system control unit 301 decides the operation modes of the fans 123*a* and 123*b* of the cooling apparatuses 120*a* and 120*b* based on the shooting settings decided in step S604.

Recently, the number of image capture apparatuses having high-quality shooting settings such as 4K and 8K exceeding Full HD (FHD) is increasing, and the amount of heat generated in the image capture apparatus during image shooting tends to increase at the high-quality shooting settings, compared to FHD and the like. Considering this, when the shooting setting in step S604 is 4K or 8K higher in quality than FHD, the system control unit 301 determines that the shooting setting in step S604 is a shooting setting at which the amount of generated heat is larger than at FHD, and advances the process to step S606; otherwise, advances the process to step S607. In the present embodiment, it is determined that the amount of heat generated in the image capture apparatus becomes larger at a high-image-quality shooting setting such as 4K or 8K than at FHD. However, the processing is not limited to this, and the tendency of heat generation may be determined based on the frame rate other than the image quality.

In step S606, the system control unit 301 decides the driving amounts for a forced cooling mode as the driving amounts of the fans 123*a* and 123*b* based on the operation modes of the fans 123*a* and 123*b* decided in step S605, and stores them in the system memory 303. The cooling control unit 111*b* transmits, to the image capture apparatuses 100*a* and 100*b*, control information based on the driving amounts of the fans 123*a* and 123*b* that are stored in the system memory 303. The image capture apparatuses 100*a* and 100*b* control driving of the fans 123*a* and 123*b* based on the control information received from the control apparatus 300. As the temperature of the image capture apparatus rises, the rotational speed of the fan increases for cooling. In this case, the operating sound of the fan that is mixed in sound data recorded during image shooting is considered to increase. In the present embodiment, therefore, the fan is driven to maximize the driving amount within a range in which driving noise does not exceed a threshold in the driving amount setting processing of step S603. By driving the fan by a close to maximum driving amount among driving amounts of the fan by which the influence on sound data recorded during image shooting is reduced, image shooting in which the influence on sound data recorded during image shooting is reduced can be performed.

If the system control unit 301 determines in step S605 that the shooting setting is a shooting setting (for example, FHD) at which the amount of generated heat is relatively small, compared to 4K or 8K, it advances the process to step S607.

In step S607, the system control unit 301 decides driving amounts for a normal mode as the driving amounts of the fans 123*a* and 123*b* based on the operation modes of the fans 123*a* and 123*b* that are decided in step S605, and stores the driving amounts in the system memory 303. The cooling control unit 111*b* transmits, to the image capture apparatuses 100*a* and 100*b*, control information based on the driving amounts of the fans 123*a* and 123*b* that are stored in the system memory 303. The image capture apparatuses 100*a* and 100*b* control driving of the fans 123*a* and 123*b* based on the control information received from the control apparatus 300. The driving amount in the normal mode corresponds to a driving amount for controlling the rotational speeds of the fans 123*a* and 123*b* in accordance with the temperatures of the image capture apparatuses 100*a* and 100*b* that are set in advance in the image capture apparatuses 100*a* and 100*b* to which the cooling apparatuses 120*a* and 120*b* are connectable.

In step S608, the system control unit 301 transmits the control information to the image capture apparatuses 100*a* and 100*b*, and the image capture apparatuses 100*a* and 100*b* start image shooting processing.

Figure 7:
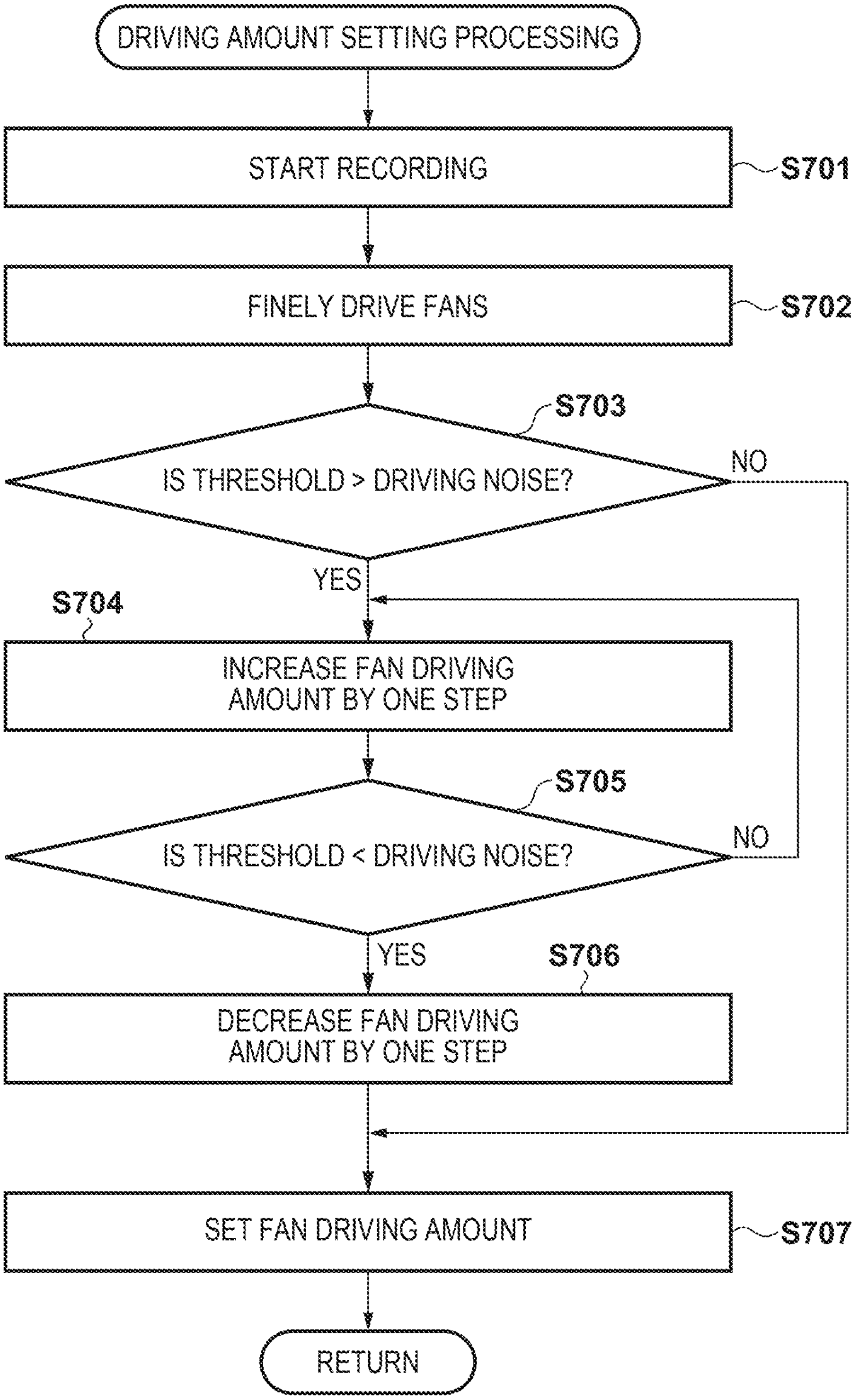
FIG. 7 is a flowchart illustrating driving amount setting processing according to the first embodiment.

FIG. 7 is flowchart illustrating the driving amount setting processing in step S603 of FIG. 6.

The processing in FIG. 7 is executed for each of the image capture apparatuses 100*a* and 100*b* connected to the control apparatus 300. In the following description, the driving amount of the image capture apparatus 100*a* by driving amount setting processing is represented as A, and that of the image capture apparatus 100*b* by driving amount setting processing is represented as B. When three or more image capture apparatuses are connected, the driving amounts of fans are set by the number of image capture apparatuses and stored in the system control unit 301. In the present embodiment, sound data generated by the external microphone 200 is recorded in the control apparatus 300.

In step S701, the system control unit 301 starts recording sound data received from the external microphone 200. Based on control information received from the system control unit 301 of the control apparatus 300, the microphone control unit 201 of the external microphone 200 transmits sound data collected by the sound collection unit 202 to the control apparatus 300. The system control unit 301 of the control apparatus 300 receives the sound data from the external microphone 200 via the communication unit 308, and stores it in the system memory 303.

In step S702, the cooling control unit 111*b* finely drives the fan 123*a* or 123*b* of the cooling apparatus 120*a* or 120*b* based on the control information received from the control apparatus 300. Fine driving is to operate the fan in a state in which the influence of the operating sound of the fan on sound data recorded during image shooting becomes minimum. For example, fine driving is to drive the fan at a lowest rotational speed in the normal mode. However, fine driving is not limited to this.

In step S703, the system control unit 301 determines, based on sound data received from the external microphone 200 upon finely driving the fans 123*a* and 123*b* in step S702, whether driving noise exceeds the threshold. The driving noise corresponds to the operating sound of the fan 123*a* or 123*b* of the cooling apparatus 120*a* or 120*b*. If the driving noise is smaller than the threshold, the system control unit 301 advances the process to step S704 to increase the driving amount of the fan 123*a* or 123*b* by one step. One step is, for example, a minimum driving amount controllable by the cooling control unit 111*b*, but is not limited to this. If the driving noise is equal to or larger than the threshold, the system control unit 301 determines that the driving noise cannot be decreased any more, and advances the process to step S707.

In step S705, the system control unit 301 determines whether the driving noise that has increased in accordance with the driving amount of the fan 123*a* or 123*b* set in step S704 exceeds the threshold. If the driving noise exceeds the threshold, the system control unit 301 advances the process to step S706 to decrease the driving amount of the fan 123*a* or 123*b* by one step. If the driving noise becomes equal to or smaller than the threshold, the system control unit 301 returns the process to step S704 to increase again the driving amount of the fan 123*a* or 123*b* by one step. In this manner, the driving amount of the fan 123*a* or 123*b* is gradually increased and set to a maximum driving amount as long as the driving noise does not exceed the threshold. A close to maximum driving amount can be set among driving amounts of the fan by which the influence on sound data recorded during image shooting is reduced.

In step S707, the system control unit 301 stores the current driving amount of the fan 123*a* or 123*b* in the system memory 303, and ends the processing.

Figure 8:
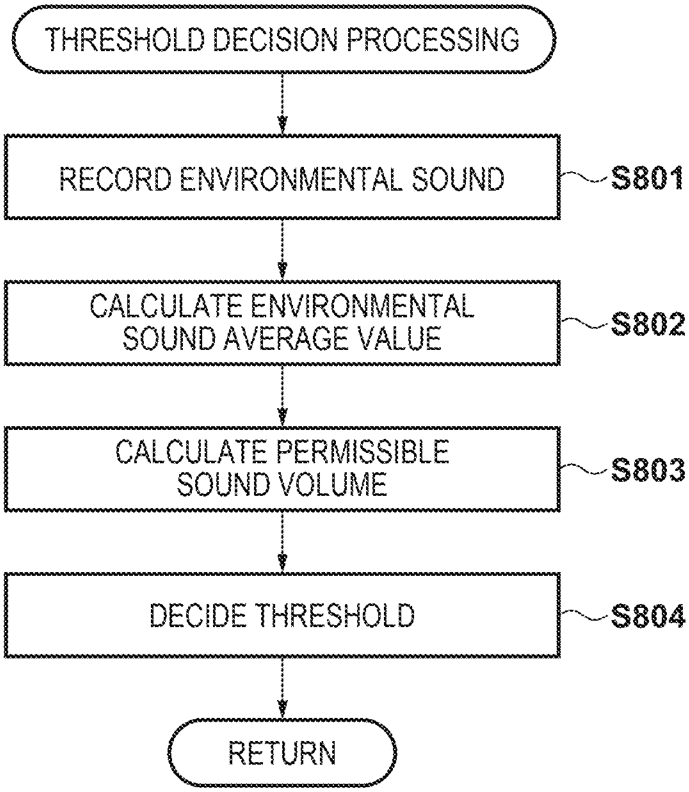
FIG. 8 is a flowchart illustrating threshold decision processing according to the first embodiment.

FIG. 8 is a flowchart illustrating the threshold decision processing in step S602 of FIG. 6.

In step S801, the system control unit 301 records an environmental sound by a recording microphone (for example, 10 sec). The recording microphone is a microphone used to record an environmental sound, and includes at least one of the external microphone 200 and the camera microphones 113*a* and 113*b* of the image capture apparatuses 100*a* and 100*b*.

In step S802, the system control unit 301 calculates the average value of the environmental sound in, for example, decibel (dB) from sound data of the environmental sound recorded in step S801.

In step S803, the system control unit 301 calculates a sound volume permissible in actual image shooting by adding a margin of, for example, 20 dB to the average value of the environmental sound calculated in step S802.

In step S804, the system control unit 301 stores, in the system memory 303, the permissible sound volume calculated in step S803 as the threshold of the processing in step S603, and ends the processing.

According to the first embodiment, the fan is driven by a close to maximum driving amount among driving amounts of the fan by which the influence on sound data recorded during image shooting is reduced. As a result, image shooting in which the influence on sound data recorded during image shooting is reduced can be performed.

Second Embodiment

Next, the second embodiment will be explained with reference to FIG. 9.

In the system according to the present embodiment, for example, when the shooting directions of the image capture apparatuses 100*a* and 100*b* are different and respectively shoot different objects, it becomes difficult to record the sounds of the respective objects by one external microphone 200 if the shooting angle is switched from the image capture apparatuses 100*a* and 100*b*. To solve this, in the second embodiment, an example in which a recording microphone is switched in switching the shooting angle will be explained.

In the first embodiment, an example in which sound data is obtained by the external microphone 200 in image shooting has been described. In the second embodiment, an example in which sound data is obtained by camera microphones 113*a* and 113*b* of image capture apparatuses 100*a* and 100*b* will be explained.

Note that the second embodiment is executable using a plurality of microphones, and the microphone may be incorporated in an image capture apparatus or connected as an external apparatus. Detailed specifications of a cooling apparatus 120, a control apparatus 300, and the like are similar to those in the first embodiment, and a description thereof will not be repeated.

When the recording microphone is switched at the same time as switching the shooting angle, the influence of the operating sound of the fan on sound data recorded during image shooting may be increased by the fan driving amount decision method using a single microphone, as in the first embodiment.

For example, in a case where multi-angle shooting according to the first embodiment is performed, if the camera microphone 113*a* of the image capture apparatus 100*a* is used as the recording microphone, the distance between a fan 123*b* of a cooling apparatus 120*b* connected to the image capture apparatus 100*b* and the camera microphone 113*a* of the image capture apparatus 100*a* is assumed to be larger than the distance between a fan 123*a* of a cooling apparatus 120*a* connected to the image capture apparatus 100*a* and the camera microphone 113*a* of the image capture apparatus 100*a*. In this case, when a system control unit 301 sets the driving amounts of the fans 123*a* and 123*b* by driving amount setting processing, the fan 123*b* of the image capture apparatus 100*b* may be driven more than the fan 123*a* of the image capture apparatus 100*a*. If the recording microphone is switched to the camera microphone 113*b* of the image capture apparatus 100*b*, especially the operating sound of the fan 123*b* of the image capture apparatus 100*b* may greatly influence sound data recorded during image shooting.

In the second embodiment, therefore, the recording microphone is switched in switching the shooting angle, and the driving amounts of the fans 123*a* and 123*b* are decided in consideration of the relationship between the fans 123*a* and 123*b* and camera microphones 113*a* and 113*b* of all the image capture apparatuses 100*a* and 100*b*.

Figure 9:
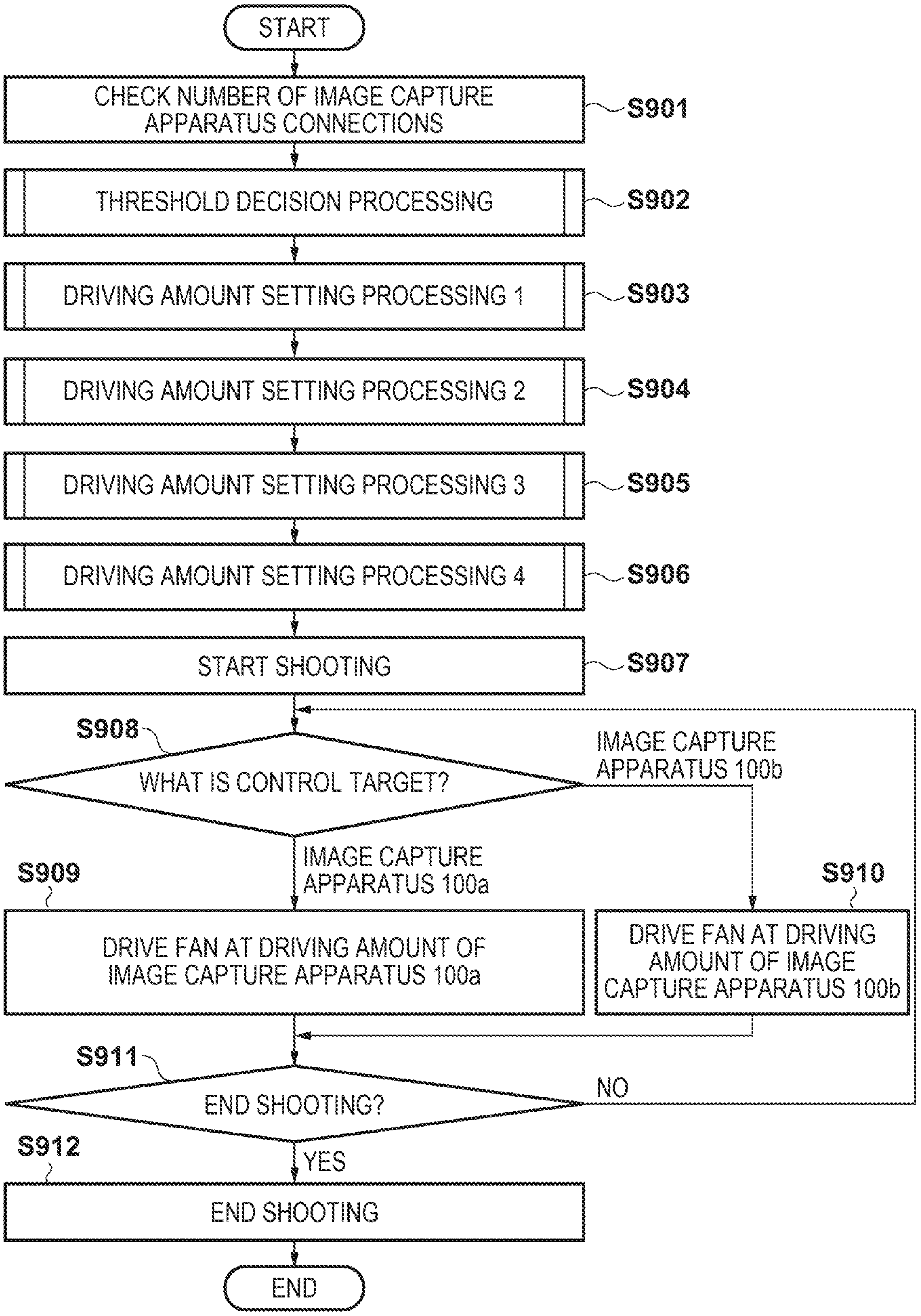
FIG. 9 is a flowchart illustrating control processing according to a second embodiment.

FIG. 9 is a flowchart illustrating control processing of the system according to the second embodiment.

The processing in FIG. 9 is implemented by executing a program stored in a ROM by the system control unit 301 of the control apparatus 300, and controlling the image capture apparatuses 100*a* and 100*b*. The processing in FIG. 9 starts in a state in which the image capture apparatuses 100*a* and 100*b* and the control apparatus 300 are connected in a communication-enabling manner. Note that the cooling apparatus 120*a* is connected to the image capture apparatus 100*a*, and the cooling apparatus 120*b* is connected to the image capture apparatus 100*b*.

In step S901, the system control unit 301 checks the number of image capture apparatuses connected to the control apparatus 300. In the present embodiment, an example in which the number of image capture apparatuses is two and the camera microphones 113*a* and 113*b* of the image capture apparatuses 100*a* and 100*b* are used will be explained. However, the present disclosure is not limited to this example, and three or more image capture apparatuses and camera microphones may be used.

In step S902, the system control unit 301 performs threshold decision processing similar to that in step S602 of FIG. 6.

In steps S903 to S906, the system control unit 301 performs driving amount setting processing similar to that in step S603 of FIG. 6. In the present embodiment, the two image capture apparatuses 100*a* and 100*b* are connected to the control apparatus 300, and a total of two camera microphones 113*a* and 113*b* are used. Thus, driving amount setting processing is performed four times in steps S903 to S906 based on combinations of the image capture apparatuses 100*a* and 100*b* and the fans 123*a* and 123*b* of the image capture apparatuses 100*a* and 100*b*. Step S903 is driving amount setting processing 1 based on a combination of the camera microphone 113*a* and fan 123*a* of the image capture apparatus 100*a*. Step S904 is driving amount setting processing 2 based on a combination of the camera microphone 113*a* of the image capture apparatus 100*a* and the fan 123*b* of the image capture apparatus 100*b*. Step S905 is driving amount setting processing 3 based on a combination of the camera microphone 113*b* of the image capture apparatus 100*b* and the fan 123*a* of the image capture apparatus 100*a*. Step S906 is driving amount setting processing 4 based on a combination of the camera microphone 113*b* and fan 123*b* of the image capture apparatus 100*b*. Accordingly, the influence of the operating sound of the fan on sound data recorded during image shooting can be reduced in all the combinations of the recording microphones and fans used in the system according to the second embodiment. In the second embodiment, a driving amount set in step S903 by the system control unit 301 is represented as A, a driving amount set in step S904 is represented as B, a driving amount set in step S905 is represented as C, and a driving amount set in step S906 is represented as D. The driving amounts A and B are driving amounts of the fan 123*a* of the image capture apparatus 100*a*, and the driving amounts C and D are driving amounts of the fan 123*b* of the image capture apparatus 100*b*.

In step S907, the system control unit 301 transmits control information to the image capture apparatuses 100*a* and 100*b*, and the image capture apparatuses 100*a* and 100*b* start image shooting processing.

In step S908, the system control unit 301 checks a control target image capture apparatus that performs image shooting and sound recording in accordance with a user operation. If the system control unit 301 determines that the image capture apparatus 100*a* performs image shooting and sound recording, it advances the process to step S909.

In step S909, the system control unit 301 transmits control information for driving the fan 123*a* by the cooling control unit 111*b* of the image capture apparatus 100*a* by the driving amount A of the fan 123*a* of the image capture apparatus 100*a* that is stored in a system memory 303. If the image capture apparatus 100*b* performs image shooting and sound recording, the system control unit 301 advances the process to step S910.

In step S910, the system control unit 301 transmits control information for driving the fan 123*b* by the cooling control unit 111*b* of the image capture apparatus 100*b* by the driving amount B of the fan of the image capture apparatus 100*b* that is stored in the system memory 303.

In step S911, the system control unit 301 determines whether to end image shooting in accordance with a user operation or the like. If the system control unit 301 determines not to end image shooting, it returns the process to step S908 to continue driving of the fan by the driving amount of the control target image capture apparatus.

If the system control unit 301 determines to end image shooting, it advances the process to step S912 to transmit, to the image capture apparatuses 100*a* and 100*b*, control information for ending image shooting, and then ends the processing.

According to the second embodiment, the recording microphone is switched in switching the shooting angle, and the driving amounts of the fans 123*a* and 123*b* are decided in consideration of the relationship between the fans 123*a* and 123*b* and camera microphones 113*a* and 113*b* of all the image capture apparatuses 100*a* and 100*b*. As a result, image shooting in which the influence on sound data recorded during image shooting is reduced can be performed.

Third Embodiment

Next, the third embodiment will be explained with reference to FIGS. 10 and 11.

In the first embodiment, the system control unit 301 drives the fan in a forced cooling mode or a normal mode by a driving amount set by driving amount setting processing. In this case, the operation mode of the fan is not changed during image shooting. In the normal mode, the image capture apparatus controls the rotational speed of the fan in accordance with heat generation of the image capture apparatus, and the driving amount may become larger than an expected one to cope with a temperature rise caused by an external factor such as air conditioning or sunlight. In the normal mode, only heat generation of the image capture apparatus is coped with, and the influence on sound data recorded during image shooting is not always considered.

In the second embodiment, the system control unit 301 drives the fans 123*a* and 123*b* by driving amounts corresponding to the relationship between the camera microphones 113*a* and 113*b* of the image capture apparatuses 100*a* and 100*b* and the fans 123*a* and 123*b* of the image capture apparatuses 100*a* and 100*b*. The fan is driven by a close to maximum driving amount among driving amounts of the fan by which the influence on sound data recorded during image shooting is reduced, similar to a case where the fan is driven by a driving amount set by driving amount setting processing according in the first embodiment.

In the first and second embodiments, when heat generation of the image capture apparatuses 100*a* and 100*b* is small, excessive cooling many be performed. For example, when the cooling apparatus 120*a* and 120*b* are driven by batteries, the batteries may be consumed.

In the third embodiment, an example in which the influence of the operating sound of the fan on sound data recorded during image shooting and consumption of the battery are considered, the temperature of the image capture apparatus is always monitored, and the fan driving method is switched in accordance with heat generation of the image capture apparatus will be explained.

Note that the configurations of an image capture apparatus 100, a cooling apparatus 120, and a control apparatus 300 that constitute a system according to the third embodiment are similar to those in the first embodiment.

Figure 10:
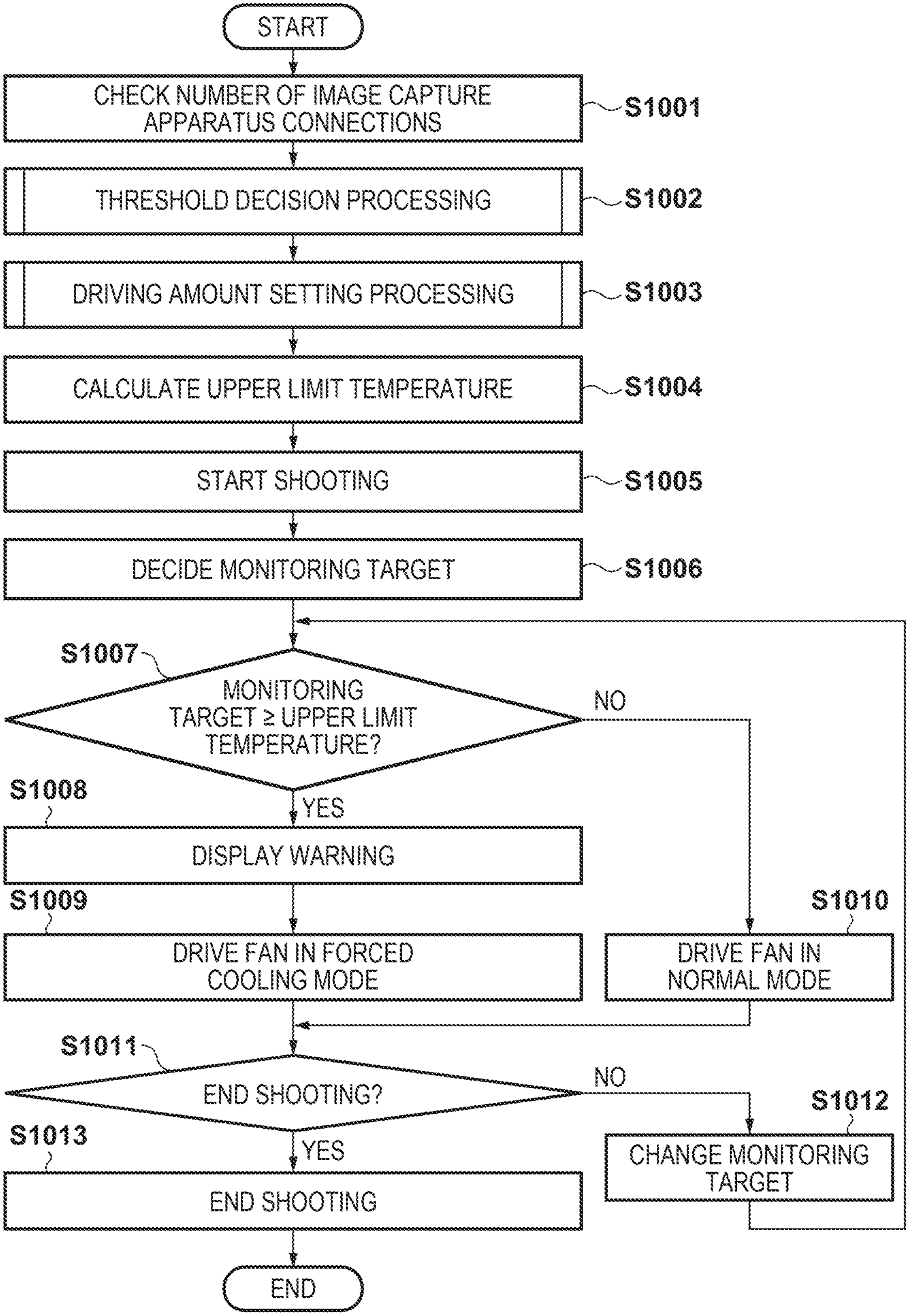
FIG. 10 is a flowchart illustrating control processing according to a third embodiment.

FIG. 10 is a flowchart illustrating control processing of the system according to the third embodiment.

In step S1001, the system control unit 301 checks the number of image capture apparatuses connected to the control apparatus 300. In the present embodiment, an example in which the number of image capture apparatuses is two and the camera microphone of each image capture apparatus is used will be explained. However, the present disclosure is not limited to this example, and three or more image capture apparatuses and camera microphones may be used.

In step S1002, the system control unit 301 performs threshold decision processing similar to step S602 of FIG. 6.

In step S1003, the system control unit 301 performs driving amount setting processing similar to step S603 of FIG. 6.

In step S1004, a cooling control unit 111*b* calculates, from the driving amounts of image capture apparatuses 100*a* and 100*b* in the normal mode, an upper limit temperature at which cooling is possible by the driving amount of the fan set in step S1003, and transmits the upper limit temperature to the control apparatus 300 via a communication unit 118. The system control unit 301 stores, in a system memory 303, temperature information received from the image capture apparatuses 100*a* and 100*b* via a communication unit 308.

In step S1005, the system control unit 301 transmits control information to the image capture apparatuses 100*a* and 100*b*, and the image capture apparatuses 100*a* and 100*b* start image shooting processing.

In step S1006, the system control unit 301 decides a monitoring target image capture apparatus whose temperature information is monitored.

In step S1007, the system control unit 301 obtains temperature information from the monitoring target image capture apparatus decided in step S1006, and determines whether the temperature of the monitoring target image capture apparatus is equal to or higher than the upper limit temperature stored in the system memory 303. If the temperature of the monitoring target image capture apparatus has reached the upper limit temperature, the system control unit 301 advances the process to step S1008. If the temperature of the monitoring target image capture apparatus is lower than the upper limit temperature, the system control unit 301 advances the process to step S1010.

Figure 11:
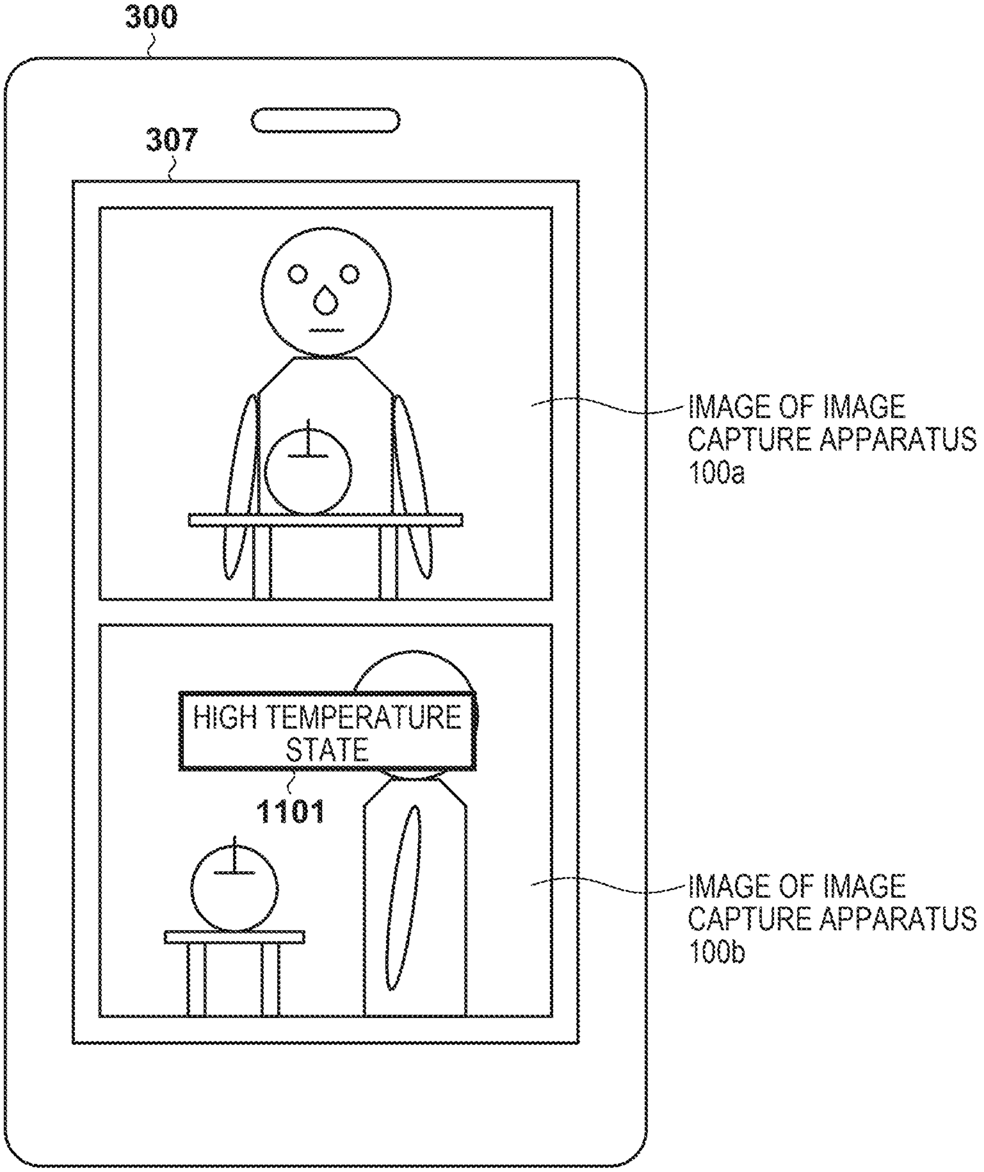
FIG. 11 is a view illustrating a warning screen in the control processing according to the third embodiment.

In step S1008, the system control unit 301 displays a warning 1101 exemplified in FIG. 11 on a display unit 307, and notifies the user that the monitoring target image capture apparatus is at high temperature. In the present embodiment, the system control unit 301 uses for image shooting even an image capture apparatus that has reached the upper limit temperature, in order to keep image shooting even after displaying the warning. After displaying the warning, cooling takes precedence, and selection of the shooting angle becomes impossible or the power supply is automatically turned off by the function of the image capture apparatus.

Since the monitoring target image capture apparatus has reached the upper limit temperature in step S1009, the operation mode of the fan of the monitoring target image capture apparatus is set to the forced cooling mode, and image shooting is continued. The system control unit 301 transmits control information to the monitoring target image capture apparatus so as to cause the monitoring target image capture apparatus to drive the fan by a close to maximum driving amount. Then, the cooling control unit of the monitoring target image capture apparatus drives the fan.

Since the monitoring target image capture apparatus has not reached the upper limit temperature in step S1010, the system control unit 301 sets the operation mode of the fan to the normal mode, and continues image shooting.

In step S1011, the system control unit 301 determines whether to end image shooting in accordance with a user operation or the like. If the system control unit 301 determines not to end image shooting, it advances the process to step S1012. If the system control unit 301 determines to end image shooting, it advances the process to step S1013.

In step S1012, the system control unit 301 changes the monitoring target image capture apparatus, and returns the process to step S1007.

In step S1013, the system control unit 301 transmits, to the image capture apparatuses 100*a* and 100*b*, control information for ending image shooting, and then ends the processing.

By repetitively executing steps S1007 to S1012, the system control unit 301 can monitor the temperatures of all the image capture apparatuses 100*a* and 100*b* connected to the control apparatus 300, and perform image shooting by proper fan driving amounts.

According to the third embodiment, when the shooting angle is automatically changed in rotation, an appropriate ratio of rotation can be decided based on the tendency of heat generation of the image capture apparatuses 100*a* and 100*b* and the cooling capacity of the cooling apparatuses 120*a* and 120*b*, at the same time as control processing in the third embodiment.

Fourth Embodiment

Next, the fourth embodiment will be explained with reference to FIG. 12.

In the first to third embodiments, the system control unit 301 sets, by driving amount setting processing for each of the cooling apparatuses 120*a* and 120*b* of the image capture apparatuses 100*a* and 100*b*, a driving amount by which the influence on sound data recorded during image shooting is reduced, and controls the operations of the fans 123*a* and 123*b*. However, when the cooling apparatuses 120*a* and 120*b* are close to each other, for example, when the cooling apparatuses 120*a* and 120*b* of the image capture apparatuses 100*a* and 100*b* placed on the same desk or the same tripod are operated, the operating sounds of the fans 123*a* and 123*b* may influence sound data recorded during image shooting more than a case where the fan 123*a* or 123*b* is operated alone. This is because vibrations of the fans 123*a* and 123*b* transmit to the camera microphones 113*a* and 113*b* of the image capture apparatuses 100*a* and 100*b* placed on the same desk or the same tripod, or because of resonance generated when the fans 123*a* and 123*b* are simultaneously driven.

In the fourth embodiment, an example of, when cooling apparatuses 120*a* and 120*b* are simultaneously driven, setting the driving amounts of fans by which the influence of the operating sounds of fans 123*a* and 123*b* on sound data recorded during image shooting is reduced will be explained.

Note that the configurations of an image capture apparatus 100, a cooling apparatus 120, and a control apparatus 300 that constitute a system according to the fourth embodiment are similar to those in the first embodiment.

Figure 12:
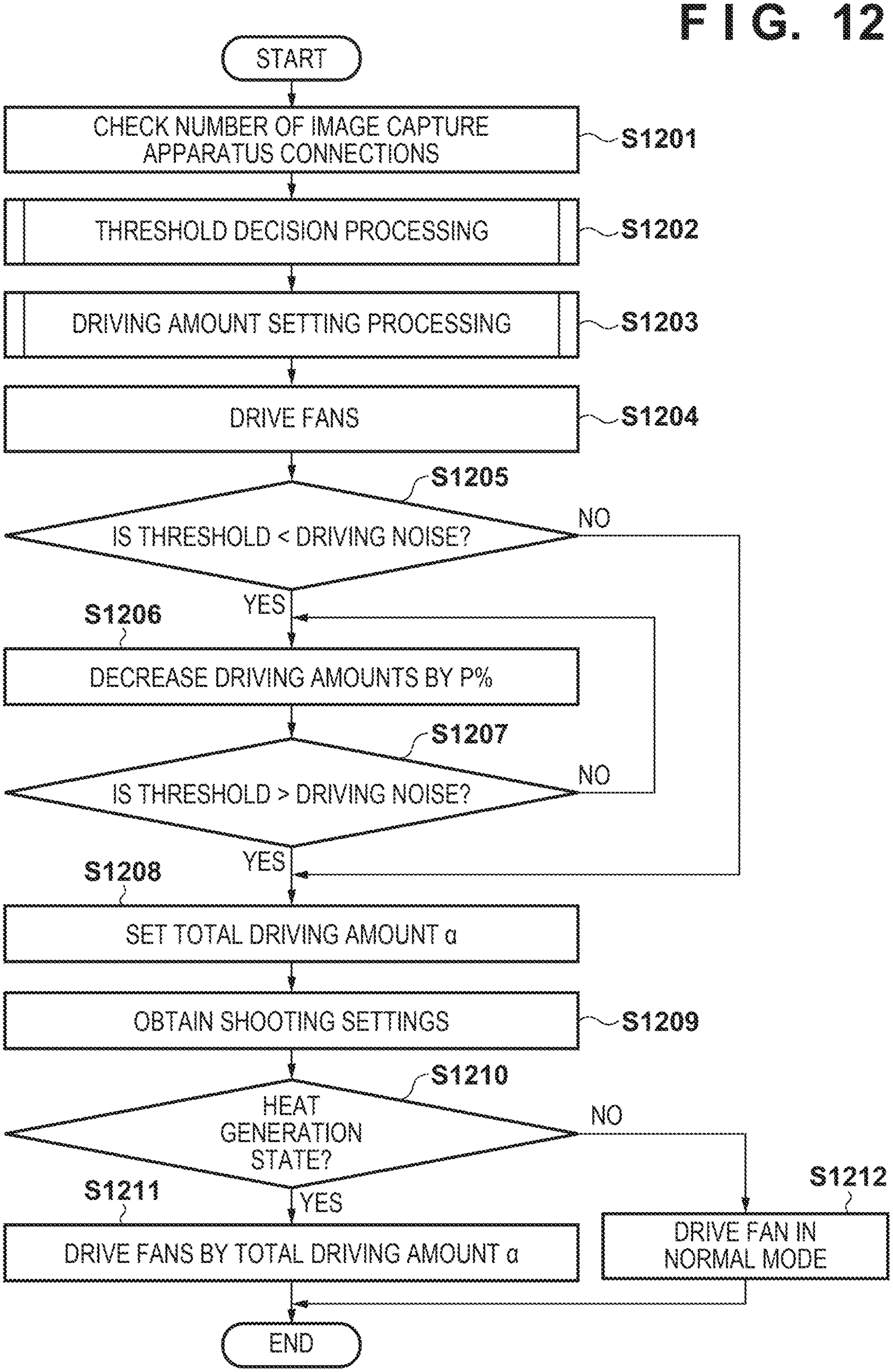
FIG. 12 is a flowchart illustrating control processing according to a fourth embodiment.

FIG. 12 is a flowchart illustrating control processing of the system according to the fourth embodiment.

In the fourth embodiment, an example of using camera microphones 113*a* and 113*b* of image capture apparatuses 100*a* and 100*b* as recording microphones will be explained on the assumption that vibrations of the cooling apparatuses 120*a* and 120*b* transmit to the camera microphones 113*a* and 113*b* of the image capture apparatuses 100*a* and 100*b*. However, the present disclosure is not limited to this example.

In step S1201, the system control unit 301 checks the number of image capture apparatuses connected to the control apparatus 300. In the present embodiment, an example in which the number of image capture apparatuses is two and the camera microphone of each image capture apparatus is used will be explained. However, the present disclosure is not limited to this example, and three or more image capture apparatuses and built-in microphones may be used.

In step S1202, the system control unit 301 performs threshold decision processing similar to step S602 of FIG. 6.

In step S1203, the system control unit 301 performs driving amount setting processing similar to step S603 of FIG. 6.

In step S1204, the system control unit 301 transmits, to the image capture apparatuses 100*a* and 100*b*, control information based on the driving amounts of the fans that are stored in a system memory 303. The image capture apparatuses 100*a* and 100*b* control driving of the fans 123*a* and 123*b* based on the control information received from the control apparatus 300. The driving amount in the normal mode corresponds to a driving amount that is set in advance for the image capture apparatuses 100*a* and 100*b* connectable to the cooling apparatus 120 and is used to control the rotational speed of the fan in accordance with the temperature of the image capture apparatus.

In step S1205, the system control unit 301 determines, based on sound data collected by the camera microphones 113*a* and 113*b* of all the image capture apparatuses 100*a* and 100*b* whether driving noise has exceeded the threshold. If the driving noise is equal to or smaller than the threshold, the system control unit 301 advances the process to step S1208. If the driving noise exceeds the threshold, the system control unit 301 advances the process to step S1206.

In step S1206, the system control unit 301 decreases the driving amounts of the fans 123*a* and 123*b* of all the image capture apparatuses 100*a* and 100*b* uniformly by P %, thereby reducing the influence of the operating sounds of the fans 123*a* and 123*b* on sound data recorded during image shooting. P may be determined in advance by the system (for example, P=5), or the photographer may set an arbitrary numeral (for example, P=10 for speed preference, and P=1 for precision preference). P is not limited to this example.

In step S1207, the system control unit 301 determines whether the driving noise becomes smaller than the threshold after decreasing the driving amount in step S1206. If the driving noise becomes smaller than the threshold, the system control unit 301 advances the process to step S1208. If the driving noise becomes equal to or larger than the threshold, the system control unit 301 returns the process to step S1206.

In step S1208, the system control unit 301 sets a total driving amount α commonly applied to the fans 123*a* and 123*b* of all the image capture apparatuses 100*a* and 100*b* when the driving noise becomes smaller than the threshold in step S1207, and stores the total driving amount α in the system memory 303. When performing the processing in step S1208 through the processing in steps S1206 and S1207, a value is calculated by multiplying the driving amount set in step S1203 by P (%) in step S1206. For example, n is the number of times of execution of step S1206, and a driving amount A becomes a driving amount A' when the process reaches step S1208. Then, the driving amount A' is given by equation (1):

$$A = A \times \left(\frac{100 - P}{100}\right)^n \quad (1)$$

The total driving amount α is handled as an array, and processing of making driving amounts uniform at a single value is not performed. The total driving amount α when driving amounts A, B, and C are set in step S1203 is given by equation (2):

$$\alpha = \begin{bmatrix} A \times \left(\frac{100 - P}{100}\right)^n \\ B \times \left(\frac{100 - P}{100}\right)^n \\ C \times \left(\frac{100 - P}{100}\right)^n \end{bmatrix} \quad (2)$$

In step S1209, the system control unit 301 obtains the shooting settings of the image capture apparatuses 100*a* and 100*b* that are set by the user. The shooting settings are, for example, 4K/120P and the like.

In step S1210, the system control unit 301 decides the operation modes of the fans 123*a* and 123*b* of the cooling apparatuses 120*a* and 120*b* of the image capture apparatuses 100*a* and 100*b* based on the shooting settings decided in step S1209. When the shooting setting decided in step S1209 is 4K or 8K higher in quality than FHD, the system control unit 301 determines that the decided shooting setting is a shooting setting at which the amount of generated heat is larger than at FHD, and advances the process to step S1211. If the system control unit 301 determines that the decided shooting setting is a shooting setting (for example, FHD) at which the amount of generated heat is smaller than at, for example, 4K or 8K, it advances the process to step S1212.

In step S1211, the system control unit 301 transmits the control information to the image capture apparatuses 100*a* and 100*b* to drive the fans 123*a* and 123*b* by the total driving amount α set in step S1208, and the image capture apparatuses 100*a* and 100*b* start image shooting processing.

In step S1212, the system control unit 301 transmits the control information to the image capture apparatuses 100*a* and 100*b* to drive the fans 123*a* and 123*b* in the normal mode, and the image capture apparatuses 100*a* and 100*b* start image shooting processing.

In the fourth embodiment, the fans 123*a* and 123*b* are driven by the total driving amount α only at a shooting setting at which the image capture apparatuses 100*a* and 100*b* generate heat. However, it is also possible to decide the upper limit temperatures of the image capture apparatuses 100*a* and 100*b*, and control the driving amounts of the fans 123*a* and 123*b*, as in the third embodiment.

According to the fourth embodiment, when the cooling apparatuses 120*a* and 120*b* are simultaneously driven, image shooting in which the influence of the operating sounds of the fans 123*a* and 123*b* on sound data recorded during image shooting is reduced can be performed.

According to the present disclosure, a cooling apparatus can be properly operated so that the operating sound of the cooling apparatus does not influence a sound recorded during image shooting.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-094510, filed Jun. 11, 2024 which is hereby incorporated by reference herein in its entirety.

What is claimed is:

1. A control apparatus comprising:

a connection unit capable of connecting a plurality of image capture apparatuses and at least one microphone; and a controller that controls the plurality of image capture apparatuses and a cooling apparatus of at least one of the plurality of image capture apparatuses, wherein the controller decides a threshold of an operating sound of the cooling apparatus based on sound data obtained from the microphone upon operating the cooling apparatus, and controls an operation of the cooling apparatus to maximize a driving amount within a range in which the operating sound of the cooling apparatus does not exceed the threshold.

2. The control apparatus according to claim 1, wherein the cooling apparatus includes a fan, and the controller decides a predetermined driving amount that becomes maximum within the range in which an operating sound of the fan does not exceed the threshold.

3. The control apparatus according to claim 2, wherein the controller decides a first mode or a second mode as the operation mode of the fan based on shooting settings of the plurality of image capture apparatuses, and starts image shooting by the plurality of image capture apparatuses.

4. The control apparatus according to claim 3, wherein the controller sets the first mode as the operation mode of the fan of the image capture apparatus having a first setting as the shooting setting, and sets the second mode as the operation mode of the fan of the image capture apparatus having a second setting as the shooting setting at which heat is generated more than at the first setting.

5. The control apparatus according to claim 4, wherein the first mode is a mode in which the driving amount of the fan is controlled based on a temperature of the image capture apparatus, and the second mode is a mode in which the driving amount of the fan is controlled to the predetermined driving amount.

6. The control apparatus according to claim 4, wherein the controller determines a control target image capture apparatus from the plurality of image capture apparatuses, and sets the first mode or the second mode as the operation mode of the fan of the control target image capture apparatus.

7. The control apparatus according to claim 2, wherein the controller decides a driving amount of the fan by which the operating sound of the fan does not exceed the threshold as the driving amount of the fan is gradually increased.

8. The control apparatus according to claim 1, wherein the controller decides the threshold based on a permissible sound volume of an environmental sound obtained from the microphone.

9. The control apparatus according to claim 1, wherein the plurality of image capture apparatuses include the microphone and the cooling apparatus, the controller decides a driving amount of a first fan of a first cooling apparatus of a first image capture apparatus and a driving amount of a second fan of a second cooling apparatus of a second image capture apparatus based on sound data obtained from a first microphone of the first image capture apparatus, and the controller decides the driving amount of the first fan of the first cooling apparatus of the first image capture apparatus and the driving amount of the second fan of the second cooling apparatus of the second image capture apparatus based on sound data obtained from a second microphone of the second image capture apparatus.

10. The control apparatus according to claim 9, wherein the controller decides a fan driving amount common to all the image capture apparatuses by which an operating sound upon driving fans of all the image capture apparatuses does not exceed the threshold.

11. The control apparatus according to claim 1, wherein the controller includes a display unit that displays an image obtained from at least one of the plurality of image capture apparatuses, and pieces of temperature information are obtained from the plurality of image capture apparatuses, a high temperature state is displayed on an image obtained from an image capture apparatus in which the temperature information exceeds an upper limit, and image shooting is continued.

12. The control apparatus according to claim 11, wherein the controller decides, among the plurality of image capture apparatuses, a monitoring target image capture apparatus whose temperature is monitored, and during image shooting, temperatures of the plurality of image capture apparatuses are monitored while the monitoring target image capture apparatus is changed.

13. The control apparatus according to claim 1, wherein the controller transmits, to a delivery apparatus, a shot image received from at least one of the plurality of image capture apparatuses, and a sound obtained from the microphone during image shooting, and the plurality of image capture apparatuses are arranged apart from each other to have different shooting positions and/or shooting directions.

14. A control method of a control apparatus in which a plurality of image capture apparatuses and at least one microphone are connectable, and the plurality of image capture apparatuses and a cooling apparatus of at least one of the plurality of image capture apparatuses are controlled, the method comprising:

deciding a threshold of an operating sound of the cooling apparatus based on sound data obtained from the microphone upon operating the cooling apparatus; and controlling an operation of the cooling apparatus to maximize a driving amount within a range in which the operating sound of the cooling apparatus does not exceed the threshold.

15. A non-transitory computer-readable storage medium storing a program for causing a computer to execute a control method of a control apparatus in which a plurality of image capture apparatuses and at least one microphone are connectable, and the plurality of image capture apparatuses and a cooling apparatus of at least one of the plurality of image capture apparatuses are controlled, the method comprising:

deciding a threshold of an operating sound of the cooling apparatus based on sound data obtained from the microphone upon operating the cooling apparatus; and controlling an operation of the cooling apparatus to maximize a driving amount within a range in which the operating sound of the cooling apparatus does not exceed the threshold.

16. A system including:

a plurality of image capture apparatuses;

a cooling apparatus of at least one of the plurality of image capture apparatuses;

at least one microphone; and a control apparatus that controls the plurality of image capture apparatuses and the cooling apparatus, wherein the control apparatus decides a threshold of an operating sound of the cooling apparatus based on sound data obtained from the microphone upon operating the cooling apparatus, and controls an operation of the cooling apparatus to maximize a driving amount within a range in which the operating sound of the cooling apparatus does not exceed the threshold.

* * * * *